United States Patent
Chun et al.

(10) Patent No.: US 8,799,529 B2
(45) Date of Patent: Aug. 5, 2014

(54) DIRECT MEMORY ACCESS CONTROLLER AND OPERATING METHOD THEREOF

(75) Inventors: Ik Jae Chun, Daejeon (KR); Chun-Gi Lyuh, Daejeon (KR); Jung Hee Suk, Daejeon (KR); Sanghun Yoon, Daejeon (KR); Tae Moon Roh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 250 days.

(21) Appl. No.: 13/243,470

(22) Filed: Sep. 23, 2011

(65) Prior Publication Data

US 2012/0159015 A1     Jun. 21, 2012

(30) Foreign Application Priority Data

Dec. 15, 2010 (KR) .................. 10-2010-0128379

(51) Int. Cl.
    *G06F 13/28*     (2006.01)
(52) U.S. Cl.
    CPC ...................... *G06F 13/28* (2013.01)
    USPC ............................ 710/24; 710/26
(58) Field of Classification Search
    CPC ...................................... G06F 13/28
    See application file for complete search history.

(56) References Cited

U.S. PATENT DOCUMENTS

| | | | |
|---|---|---|---|
| 5,748,945 A * | 5/1998 | Ng | 703/23 |
| 6,418,489 B1 * | 7/2002 | Mason et al. | 710/22 |
| 6,738,881 B1 * | 5/2004 | Ollivier et al. | 711/168 |
| 7,698,473 B2 | 4/2010 | Yamazaki et al. | |
| 2010/0161849 A1 | 6/2010 | Suk et al. | |

FOREIGN PATENT DOCUMENTS

| | | |
|---|---|---|
| KR | 1020050094989 A | 9/2005 |
| KR | 1020070060854 A | 6/2007 |

OTHER PUBLICATIONS

"PrimeCell® DMA Controller (PL080)", Technical Reference Manual, 2005, Revision: r1p3, ARM Limited.

* cited by examiner

*Primary Examiner* — Ernest Unelus
*Assistant Examiner* — Ronald Modo

(57) ABSTRACT

Disclosed is an operating method of a direct memory access (DMA) controller having first and second DMA channels. The operating method includes iteratively performing a DMA transfer operation of the first DMA channel based upon loop information and transfer information of the first DMA channel; iteratively performing a DMA transfer operation of the second DMA channel based upon loop information and transfer information of the second DMA channel; reconfiguring the transfer and loop information of the first and second DMA channels; and again performing the iteratively performing a DMA transfer operation of the first DMA channel and the iteratively performing a DMA transfer operation of the first DMA channel based upon the reconfigured transfer and loop information of the first and second DMA channels.

5 Claims, 10 Drawing Sheets

DIRECT MEMORY ACCESS CONTROLLER AND OPERATING METHOD THEREOF

CROSS-REFERENCE TO RELATED APPLICATIONS

This application claims the benefits, under 35 U.S.C. §119, of Korean Patent Application No. 10-2010-0128379 filed Dec. 15, 2010, the entirety of which is incorporated by reference herein.

BACKGROUND

Exemplary embodiments relate to a direct memory access controller and its operating method, and more particularly, relate to a direct memory access controller capable of performing a channel loop transmission operation and its operating method.

Services being realized at a super-highway information network-based information age may be developed toward multimedia services which enable humans to see and hear using characters, voices, and images. This may necessitate a system processor capable of processing mass data. In particular, the system processor may access a memory very frequently at transferring of mass data such as multimedia data, image data, and the like.

A system performance may be depended upon a data transfer speed between a peripheral device processing data and a memory device. A direct memory access (DMA) transfer technique may be used to improve the system performance. In the DMA transfer technique, a processor does not take part in data transfer. That is, data transfer may be made directly between the peripheral device and the memory device connected with a bus. This may be accomplished under the control of a DMA controller. In other words, in the DMA transfer technique, the DMA controller may charge a data transfer operation instead of the processor.

Recent systems may be configured such that a processor and a memory device (or, many memory devices) are connected with a plurality of peripheral devices. In this case, it may be needed that data transfer is made rapidly and efficiently between the memory device and the peripheral devices. This requirement may be satisfied by using a multi-channel DMA controller having a plurality of transfer channels. The multi-channel DMA controller may make data transfer between the memory and the peripheral devices using different channels. A DMA transfer of the DMA controller may be made by setting registers used to determine operations of the plurality of channels.

In general, to control the DMA transfer, a system processor may frequently set the registers of the DMA controller and may frequently process interrupts according to completion of the DMA transfer. In particular, when transferring mass data, the system processor may spend a lot of time on setting of the registers used to decide operations of channels. Further, the system processor may spend a lot of time on processing of interrupts according to transfer completion of the channels. Accordingly, the system performance may be lowered.

SUMMARY

A direct memory access controller and its operating method are provided to execute a loop operation on a plurality of direct memory access channels.

One aspect of embodiments of the inventive concept is directed to provide an operating method of a direct memory access (DMA) controller having first and second DMA channels. The operating method comprises (a) iteratively performing a DMA transfer operation of the first DMA channel based upon loop information and transfer information of the first DMA channel; (b) iteratively performing a DMA transfer operation of the second DMA channel based upon loop information and transfer information of the second DMA channel; (c) reconfiguring the transfer and loop information of the first and second DMA channels; and (d) again performing the steps (a) and (b) based upon the reconfigured transfer and loop information of the first and second DMA channels.

In this embodiment, each of the steps (a) and (b) comprises (e) performing a DMA transfer operation according to a source address and a destination address included in the transfer information; (f) increasing the source address by a source address offset value included in the loop information and the destination address by a destination address offset value included in the loop information; and (g) iterating a DMA transfer operation according to the increased source address and the increased destination address.

In this embodiment, the steps (e) to (g) are iterated by a loop number included in the loop information.

In this embodiment, the operating method further comprises setting a reconfigurable number of the transfer and loop information of the first and second DMA channels.

In this embodiment, the steps (c) to (d) are iterated by the reconfigurable number.

In this embodiment, the operating method further comprises setting the transfer and loop information of the first and second DMA channels.

In this embodiment, the operating method further comprises storing data for reestablishing the transfer and loop information of the first and second DMA channels.

In this embodiment, the step (c) comprises initializing the transfer and loop information of the first and second DMA channels.

Another aspect of embodiments of the inventive concept is directed to provide a direct memory access (DMA) controller which comprises a register set unit including a plurality of register sets for setting a DMA transfer operation of a DMA channel; a channel loop management memory device configured to store data for reconfiguring the register sets; and a DMA transfer control logic configured to reconfigure the register set unit with data stored in the channel loop management memory device and to then iterate the DMA transfer operation of the DMA channel.

In this embodiment, the register set unit comprises a register storing a reconfigurable number of the register set using data stored in the channel loop management memory device, and the DMA transfer control logic reconfigures the register set unit by the reconfigurable number.

In this embodiment, the register set unit comprises a fundamental register set configured to store information for setting the DMA transfer operation of the DMA channel; and a loop register set configured to store the loop information for iterating the DMA transfer operation of the DMA channel.

In this embodiment, the loop register set comprises a loop set register configured to store whether the DMA transfer operation is iterated; a loop number register configured to store a loop number; a source address offset register configured to store a source address offset value for increasing a source address; and a destination address offset register configured to store a destination address offset value for increasing a destination address.

In this embodiment, the DMA transfer control logic performs the DMA transfer operation of the DMA channel based upon the loop information of the loop register set.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
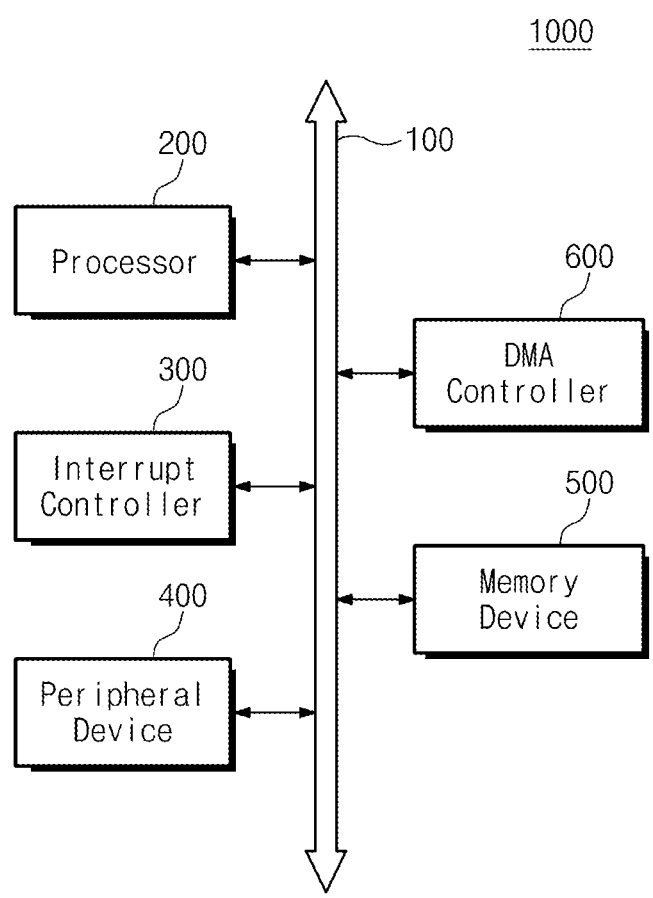
FIG. 1 is a block diagram illustrating a system including a direct memory access controller according to an exemplary embodiment of the inventive concept.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating a system including a direct memory access controller according to an exemplary embodiment of the inventive concept. Referring to FIG. 1, a system 1000 may include a system internal bus 100, a processor 200, an interrupt controller 300, a peripheral device 400, a memory device 500, and a direct memory access (DMA) controller 600.

The constituent elements 200 to 600 may be interconnected via the system internal bus 100. The processor 200 and respective blocks in the system 1000 may transfer a control signal and data via the system internal bus 100. The processor 200 may control a whole operation of the system 1000.

The performance of the system 1000 may be influenced by a data transfer speed of the memory device 500. A DMA transfer manner may be used to improve the performance of the system 1000. In the event that the DMA transfer manner is applied to the system 1000, data may be directly transferred between the memory device 500 and a local memory (not shown) in the processor 200, between the memory device 500 and the peripheral device 400, between the memory device 500 and another memory device (not shown), or between the processor 200 and the peripheral device 400.

The DMA transfer operation may be made under the control of the DMA controller 600. That is, the DMA controller 600 may control the DMA transfer operation instead of the processor 200. If the DMA transfer operation is completed, the DMA controller 600 may transfer an interrupt, indicating that data transfer is completed, to the processor 200 through the interrupt controller 300. This interrupt may be transferred directly to the processor 200 without passing through the interrupt controller 300.

The DMA controller 600 may be formed of a multi-channel DMA controller having a plurality of transfer channels. In FIG. 1, there is exemplarily illustrated one peripheral device 400 and one memory device 500. However, the system 100 may include a plurality of peripheral devices and a plurality of memory devices. In this case, the DMA controller 600 may make data transfer between the plurality of memory devices and the plurality of peripheral devices using different channels.

The DMA controller 600 may include a loop register set assigned to each channel to reduce a time taken to set registers for performing a DMA transfer operation. The DMA controller 600 may execute a DMA loop transfer operation of each channel based upon the loop register set. Further, the DMA controller 600 may include a channel loop management memory device to reduce a time taken to set registers for performing the DMA transfer operation. The DMA controller 600 may reconfigure a register set assigned to each channel based upon the channel loop management memory device, and may perform a DMA loop transfer operation with respect to a whole DMA channel. Accordingly, it is possible to reduce register setting number and time of the processor 200. Further, it is possible to reduce interrupt processing number and time of the processor 200 upon transfer completion of each channel. As a result, the performance of the system 1000 may be improved.

Figure 2:
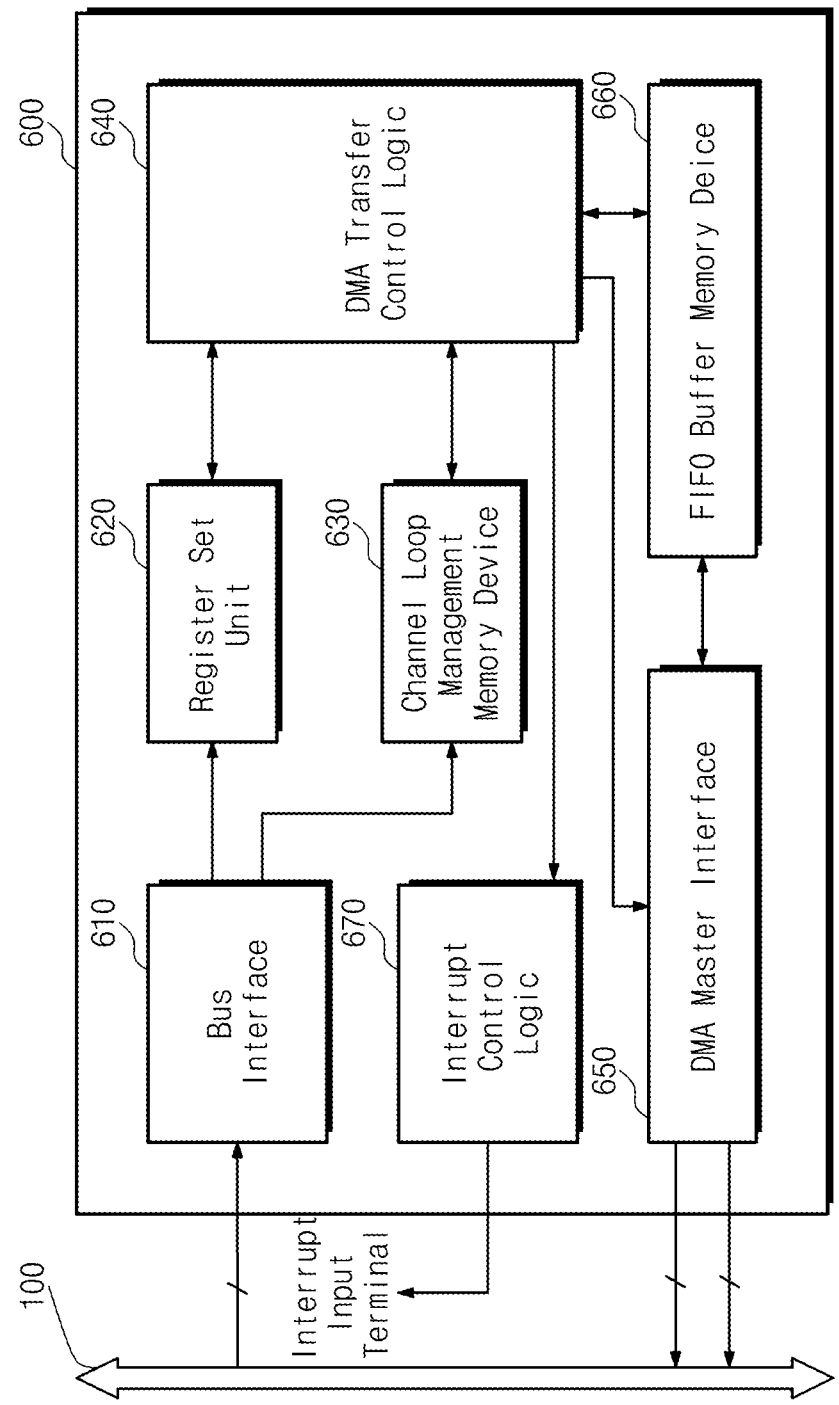
FIG. 2 is a block diagram illustrating a direct memory access controller according to an exemplary embodiment of the inventive concept.

FIG. 2 is a block diagram illustrating a direct memory access controller according to an exemplary embodiment of the inventive concept. A direct memory access (DMA) controller 600 may include a bus interface 610, a register set unit 620, a channel loop management memory device 630, DMA transfer control logic 640, a DMA master interface 650, a FIFO buffer memory device 660, and interrupt control logic 670.

The bus interface 610 may receive DMA control data provided from a processor 200 in FIG. 1 via a bus connected with a system internal bus 100. The bus interface 610 may judge a type of the input DMA control data to store the judged DMA control data in the register set unit 620 and the channel loop management memory device 630. For example, the bus interface 610 may store control data, associated with fundamental DMA transfer and DMA loop transfer on each DMA channel, in the register set unit 620. The bus interface 610 may store control data, associated with DMA loop transfer on a whole DMA channel, in the channel loop management memory device 630.

The register set unit 620 may include a fundamental register set for setting operations on a plurality of DMA channels and a loop register set for setting a loop operation of each DMA channel. The register set unit 620 may further include registers for setting DMA transfer such as a register set selection register for activating a DMA channel. The register set unit 620 will be more fully described with reference to FIG. 3.

The channel loop management memory device 630 may store data for reconfiguring register sets (e.g., the fundamental register set and the loop register set) included in the register set unit 620. Data stored in the channel loop management memory device 630 may be data for executing the DMA loop transfer operation, and may be used to reconfigure the register set unit 620 at a DMA loop operation on a whole DMA channel. The channel loop management memory device 630 may be formed of not only a volatile memory device but also a temporary storage device such as a register. The channel loop management memory device 630 will be more fully described with reference to FIG. 4.

The DMA transfer control logic 640 may be configured to control an overall operation of the DMA controller 600. That is, the DMA transfer control logic 640 may execute a DMA transfer operation based upon DMA control data set in the register set unit 620, and may generate an interrupt if the DMA transfer operation is completed. With an exemplary embodiment of the inventive concept, the DMA transfer control logic 640 may make DMA loop transfer using DMA control data set in the register set unit 620 and DMA control data stored in the channel loop management memory device 630.

The DMA transfer control logic 640 may control the register set unit 620 and the channel loop management memory device 630 to execute DMA loop transfer. Upon fundamental DMA transfer and DAM loop transfer on each DMA channel, the DMA transfer control logic 640 may control the DMA transfer operation of each DMA channel based upon control data set in the register set unit 620. Further, upon DMA loop transfer on a whole DMA channel, the DMA transfer control logic 640 may reconfigure the register set unit 620 with control data stored in the channel loop management memory device 630. Afterwards, the DMA transfer control logic 640 may control a DMA transfer operation on each DMA channel based upon reconfigured control data of the register set unit 620.

The DMA master interface 650 may execute a physical data transfer operation according to the control of the DMA transfer control logic 640. The DMA master interface 650 may make a data transfer operation via a dual-port DMA interface bus connected with the system internal bus 100. In another embodiment, the DMA master interface 650 may carry out a data transfer operation via a single-port DMA interface bus connected with the system internal bus 100.

The FIFO buffer memory device 660 may operate as a buffer for temporarily storing transfer data and related control signals at a DMA transfer operation. If the DMA transfer operation is completed, the interrupt control logic 670 may generate an interrupt indicating completion of data transfer under the control of the DMA transfer control logic 640. This interrupt may be transferred via an interrupt signal line connected with an interrupt controller 300 in FIG. 1 for managing an interrupt of the system on a whole.

Figure 3:
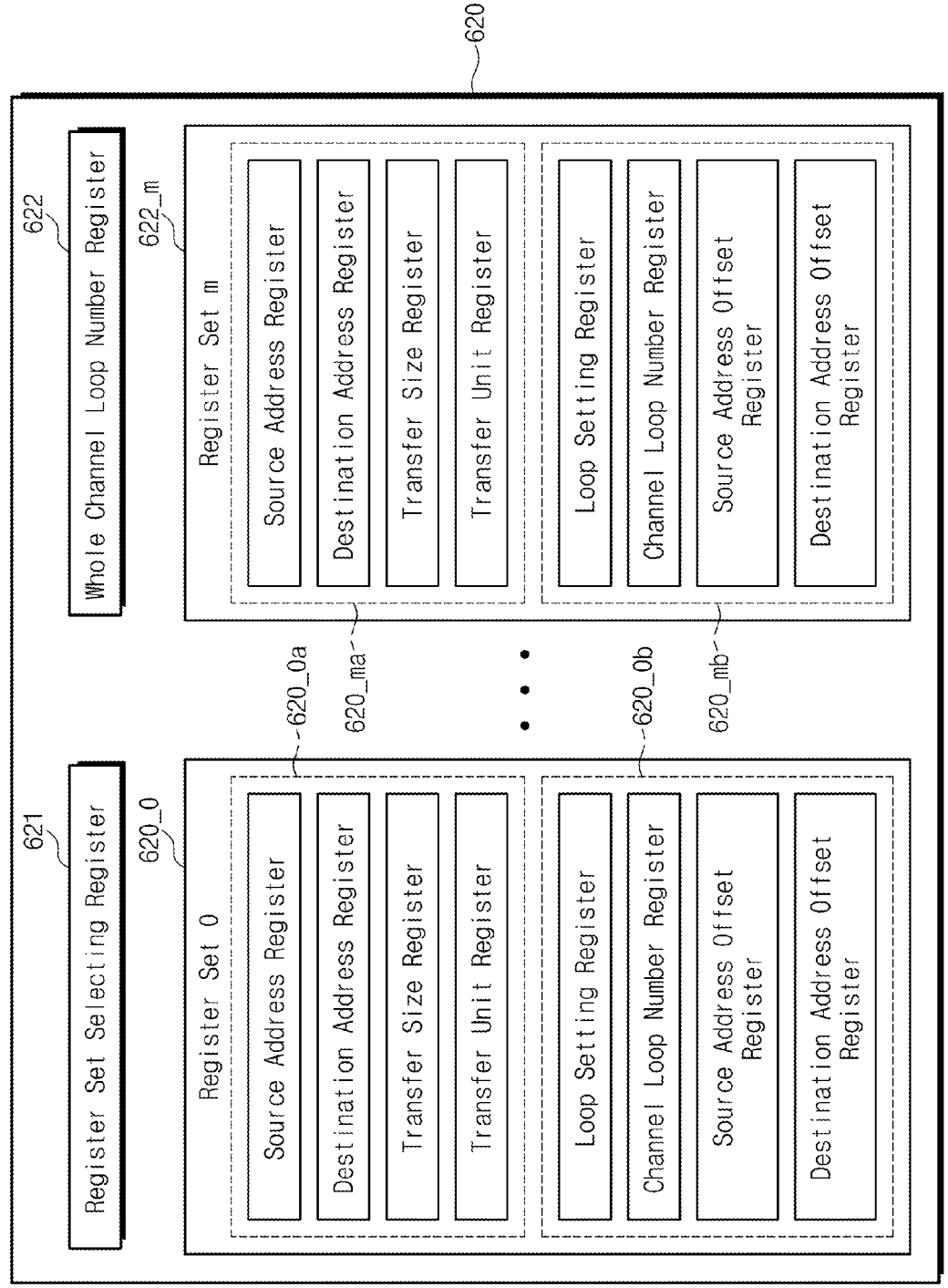
FIG. 3 is a diagram illustrating a register set unit of a direct memory access controller in FIG. 2.

FIG. 3 is a diagram illustrating a register set unit of a direct memory access controller in FIG. 2. Referring to FIG. 3, a register set unit 620 may include register sets 620_0 to 620_m assigned to a plurality of DMA channels, respectively. A DMA controller 600 in FIG. 1 may make a DMA transfer operation using the plurality of DMA channels. The register set unit 620 may include register sets which are assigned to respective DMA channels such that a DMA operation on each DMA channel is capable of being set.

Each of the register sets 620_0 to 620_m for setting a DMA transfer operation of each DMA channel may include a fundamental register set for setting a fundamental DMA transfer operation and a loop register set for setting a loop operation of each DMA channel. For example, the register set 620_0 may include the fundamental register set 620_0a and the loop register set 620_0b, and the register set 620_m may include the fundamental register set 620_ma and the loop register set 620_mb.

Each of the fundamental register sets 620_0a to 620_ma may include a source address register, a destination address register, a transfer size register, and a transfer unit register. Each of the loop register sets 620_0b to 620_mb may include a loop set register for setting execution of a loop operation, a channel loop number register for setting a loop number, a source address offset register, and a destination address offset register.

The register set unit 620 may further include a register set selection register 621 for activating a DMA channel. The register set unit 620 may further include a whole channel loop number register 622 for setting a loop number of a whole DMA channel. That is, the loop number of the whole DMA channel set in the whole channel loop number register 622 may be identical to the reconfiguration number of the register set unit 620 using control data stored in a channel loop management memory device 630.

Figure 4:
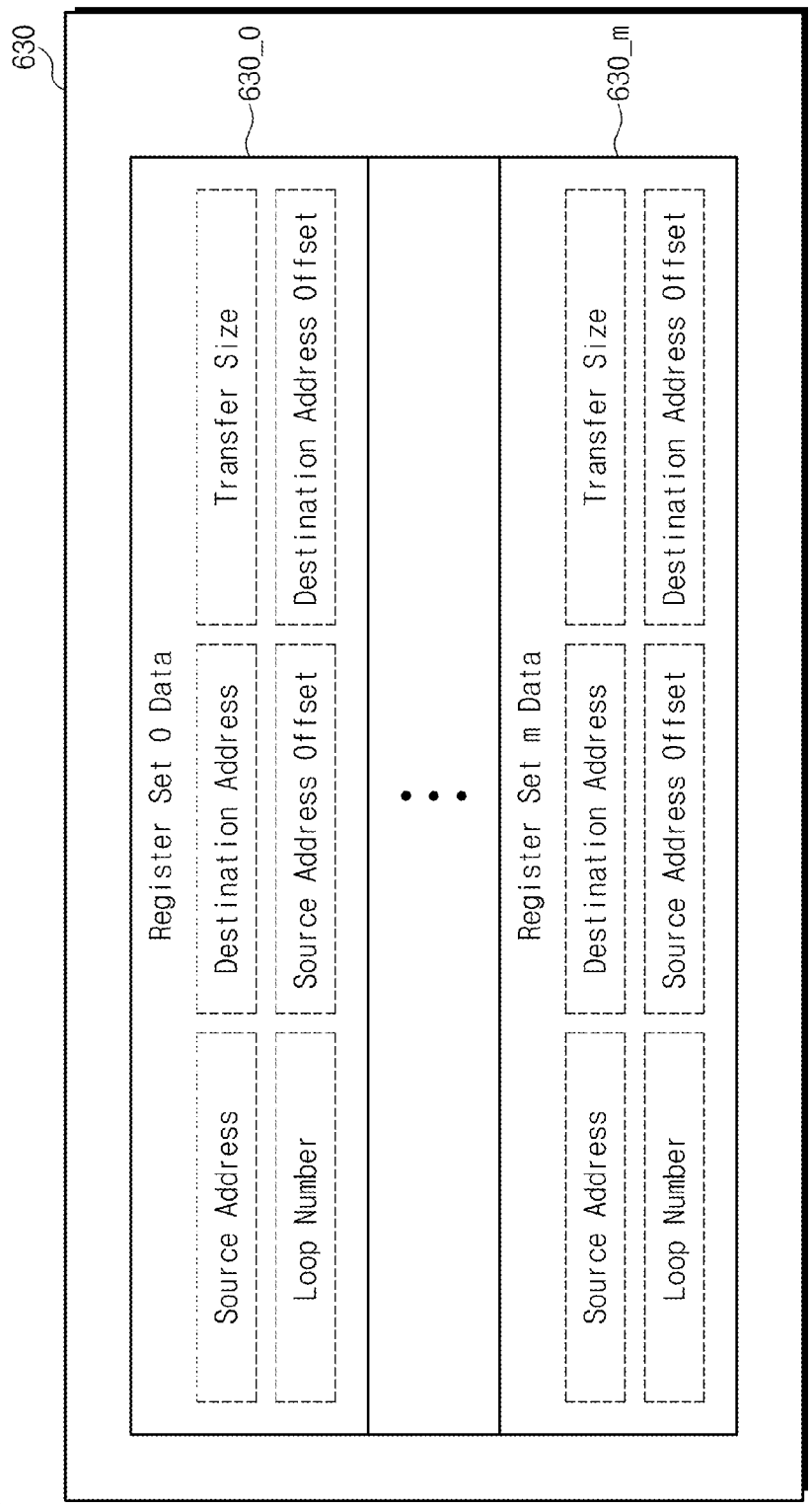
FIG. 4 is a diagram illustrating data stored in a channel loop management memory device of a direct memory access controller in FIG. 2.

FIG. 4 is a diagram illustrating data stored in a channel loop management memory device of a direct memory access controller in FIG. 2. Referring to FIG. 4, a channel loop management memory device 630 may store data 630_0 to 630_m for reconfiguring register sets 630_0 to 630_m, respectively. Upon DMA loop transfer on a whole DMA channel, the register sets 630_0 to 630_m may be reconfigured by the data 630_0 to 630_m, respectively.

Each of the data 630_0 to 630_m for reconfiguring the register sets 630_0 to 630_m may be formed of a changed value of a source address, a changed value of a destination address, a changed value of a transfer size, a changed value of a loop number, a changed value of a source address offset, and a changed value of a destination address offset.

Figure 5:
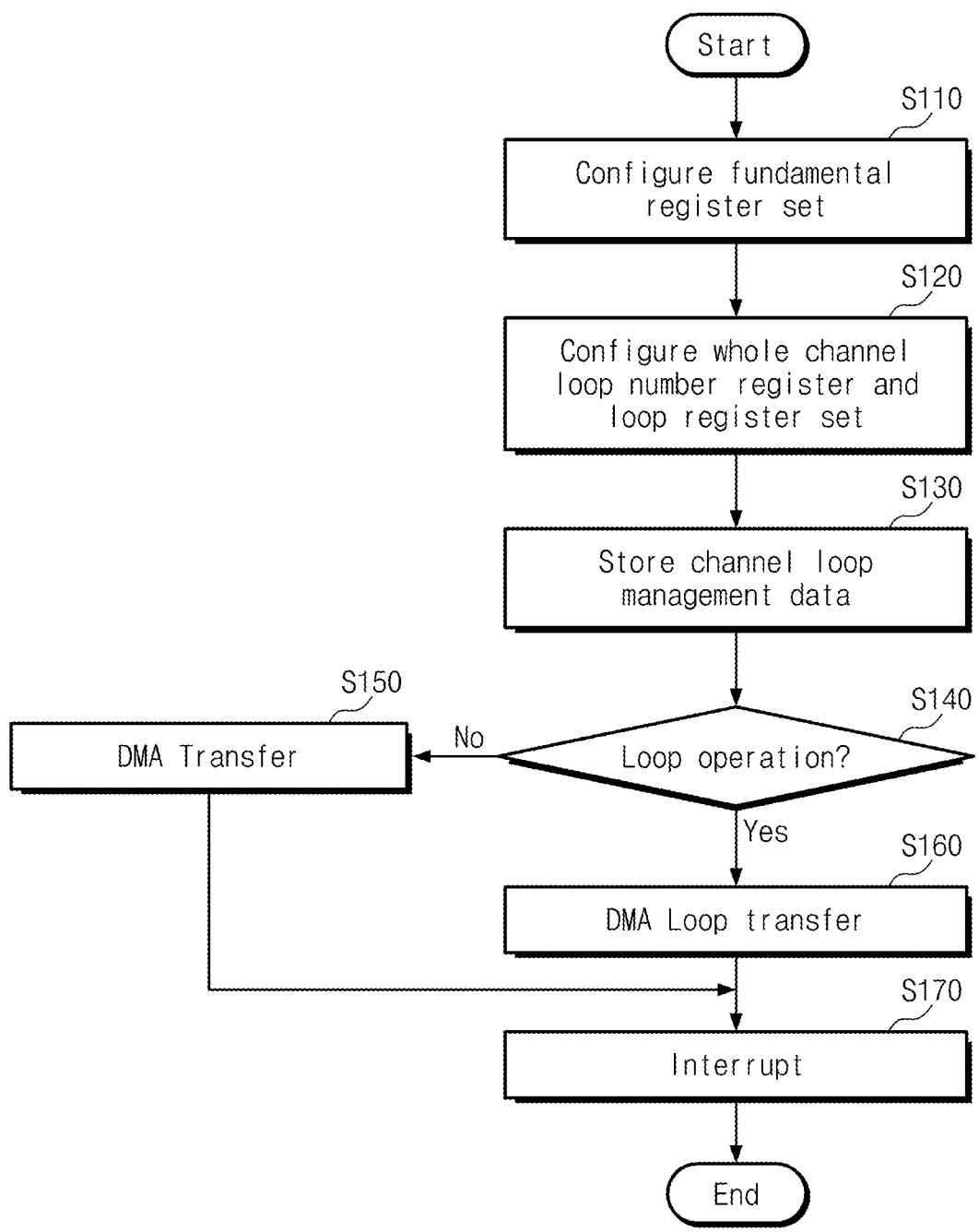
FIG. 5 is a flowchart for describing an operation of a direct memory access controller according to an exemplary embodiment of the inventive concept.

FIG. 5 is a flowchart for describing an operation of a direct memory access controller according to an exemplary embodiment of the inventive concept. A DMA loop transfer operation of a DMA controller 600 will be more fully described with reference to FIGS. 2 and 5.

In operation S110, a fundamental register set assigned to each DMA channel of a register set unit 620 may be configured by DMA control data provided from a processor 200 in FIG. 1. In operation S120, according to the DMA control data provided from the processor 200, a whole channel loop number register 622 of the register set unit 620 may be configured and a loop register rest assigned to each DMA channel may be configured. In operation S130, set-up data (i.e., channel loop management data) needed for a loop operation on the whole DMA channel may be stored in a channel loop management memory device 630.

As described in operations S110 to S130, the register set unit 620 may be set up by the DMA control data needed for a DMA transfer operation and the DMA control data may be stored in the channel loop management memory device 630. Afterwards, DMA transfer control logic 640 may make a DMA transfer operation by activating a DMA channel selected by a register set selection register 621 according to the priority. In this case, the DMA transfer control logic 640 may judge whether a DMA loop transfer operation is set, based upon a loop register set and the channel loop number register 622.

If the DMA loop transfer operation is judged not to be set, in operation S150, the DMA transfer control logic 640 may perform a fundamental DMA transfer operation. If DMA transfer is completed, in operation S170, the DMA transfer control logic 640 may control interrupt control logic 670 to generate an interrupt.

If the DMA loop transfer operation is judged to be set, in operation S160, the DMA transfer control logic 640 may perform the DMA loop transfer operation based upon the loop register set, the whole channel loop number register 622, and the channel loop management memory device 630. The DMA loop transfer operation will be more fully described with reference to FIG. 6. If the DMA loop transfer operation is completed, in operation S170, the DMA transfer control logic 640 may control interrupt control logic 670 to generate an interrupt.

Figure 6:
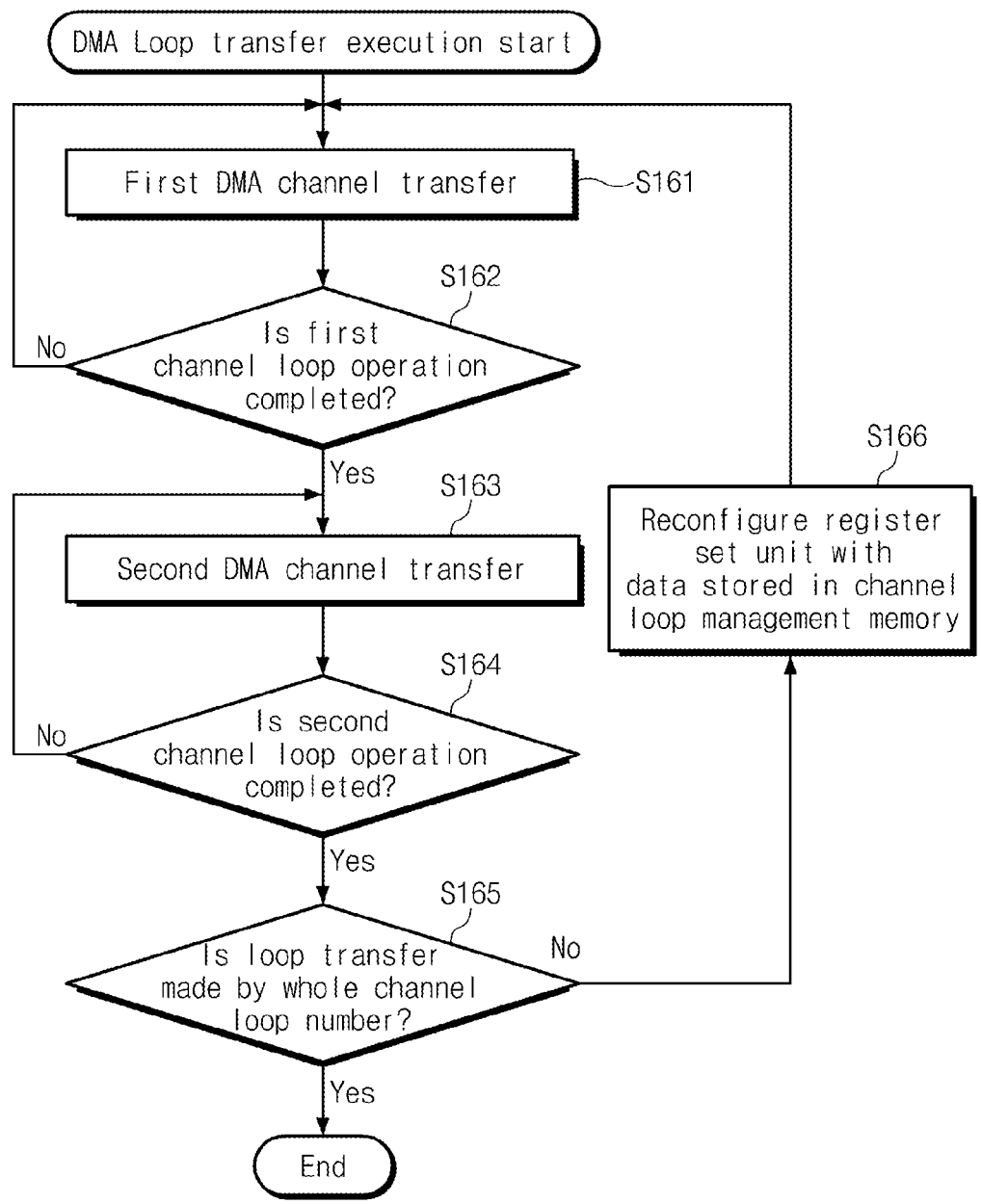
FIG. 6 is a flowchart for describing a DMA loop transfer operation according to an exemplary embodiment of the inventive concept.

FIG. 6 is a flowchart for describing a DMA loop transfer operation according to an exemplary embodiment of the inventive concept. Below, a DMA loop transfer operation of a DMA controller 600 will be more fully described with reference to FIGS. 2 and 6.

Upon transferring of mass block data, a region of a memory device may be divided into regions to be transferred via each channel, and transfer information on the divided transfer regions may be assigned to DMA channels, respectively. That is, transfer information on a divided transfer region may be assigned to a corresponding register set. Afterwards, a DMA loop transfer operation on the mass block data may be made by operating DMA channels sequentially.

The DMA loop transfer operation may be sequentially performed according to the priority of a DMA channel. That is, the DMA loop transfer operations on the DMA channels may be sequentially carried out one by one according to the priorities of the DMA channels. For ease of description, DMA loop transfer operations on two DMA channels will be described with reference to FIG. 6. However, the inventive concept is not limited thereto.

If the first DMA channel is selected, in operation S161, a DMA transfer operation may commence according to DMA transfer information configured in a fundamental register set. Afterwards, in operation S162, a DMA transfer operation of the first DMA channel may be iterated according to channel loop information stored in a loop register of the first DMA channel.

For example, DMA transfer control logic 640 may make a DMA transfer operation based upon a source address, a destination address, and a transfer size stored in the fundamental register set. Afterwards, the DMA transfer control logic 640 may perform the DMA transfer operation by reconfiguring the fundamental register set for next transfer. This may be accomplished by adding a source address offset value and a destination address offset value stored in a loop register set to a previous source address and a destination address. The DMA transfer control logic 640 may complete DMA loop transfer on a selected DMA channel by iterating the above-described operation by a channel loop number stored in the loop register set.

If the DMA transfer operation of the first DMA channel is completed, S163, a DMA transfer operation may commence based upon DMA transfer information stored in a fundamental register set of the second DMA channel. Afterwards, in operation S164, the DMA transfer operation of the second DMA channel may be iterated based upon channel loop information stored in the loop register set of the second DMA channel.

If DMA transfer operations of all selected DMA channels (e.g., the first and second DMA channels) are ended, in operation S165, a DMA loop transfer operation on a whole DMA channel may be made by a loop number stored in a whole channel loop number register 622. In operation S166, the DMA loop transfer operation of the whole DMA channel may be carried out by reconfiguring registers of a register set unit 620 using data stored in a channel loop management memory device 630. Data stored in the channel loop management memory device 630 may be deleted or maintained at the same time when all DMA transfer operations are completed.

After registers of the register set unit 620 are reconfigured, a DMA transfer operation described in operations S161 to 164 may be performed with respect to all selected DMA channels, respectively.

For example, if a DMA loop transfer operation on a whole DMA channel is performed, the DMA transfer control logic 640 may initialize registers of the register set unit 620. The DMA transfer control logic 640 may reconfigure registers of the register set unit 622 with data on a changed transfer region stored in the channel loop management memory device 630. That is, the DMA transfer control logic 640 may reconfigure a source address register with a source address change value stored in the channel loop management device 630, a destination address register with a destination address change value stored therein, and a transfer size register with a transfer size change value stored therein. Further, the DMA transfer control logic 640 may reconfigure a channel loop number register with a loop number change value, a source address offset register with a source address offset change value, and a destination address offset register with a destination address offset change value, respectively. All register sets selected via the register set selection register 621 may be reconfigured according to the above-described manner.

As described above, the DMA controller 600 according to an exemplary embodiment of the inventive concept may make DMA loop transfer of each DMA channel via the loop register set of the register set 620 and DMA loop transfer on the whole DMA channel via data stored in the channel loop management memory device 630. That is, the DMA controller 600 may perform a DMA transfer operation by changing transfer regions of the memory device independently. As a DMA channel loop transfer operation is performed by the DMA controller 600, it is possible to reduce a time taken to set registers for controlling DMA channels and a time taken to process an interrupt indicating completion of DMA transfer.

Figure 7:
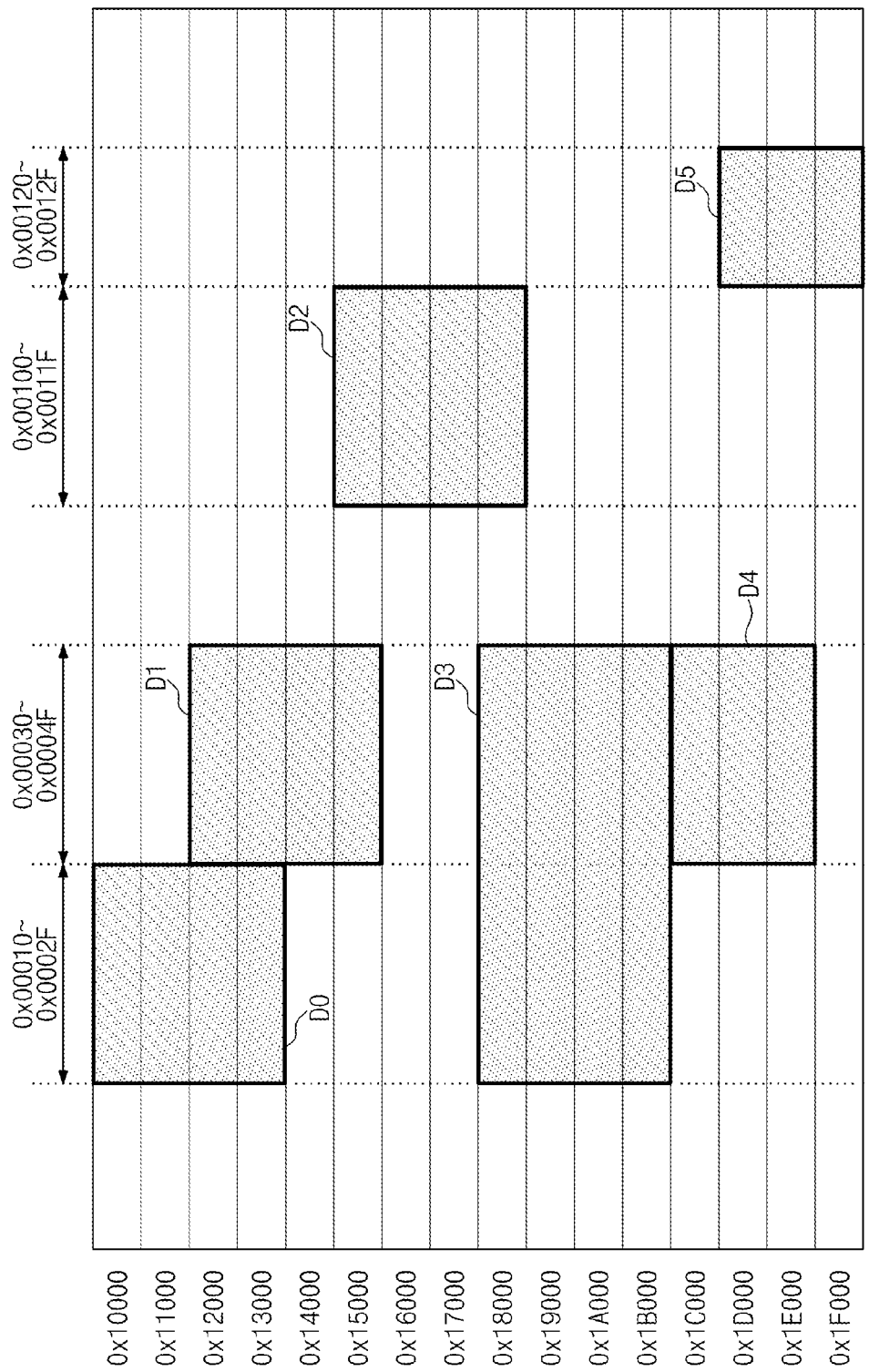
FIG. 7 is a diagram illustrating block data of a memory device to describe an operation of a direct memory access controller according to an exemplary embodiment of the inventive concept.
Figure 8:
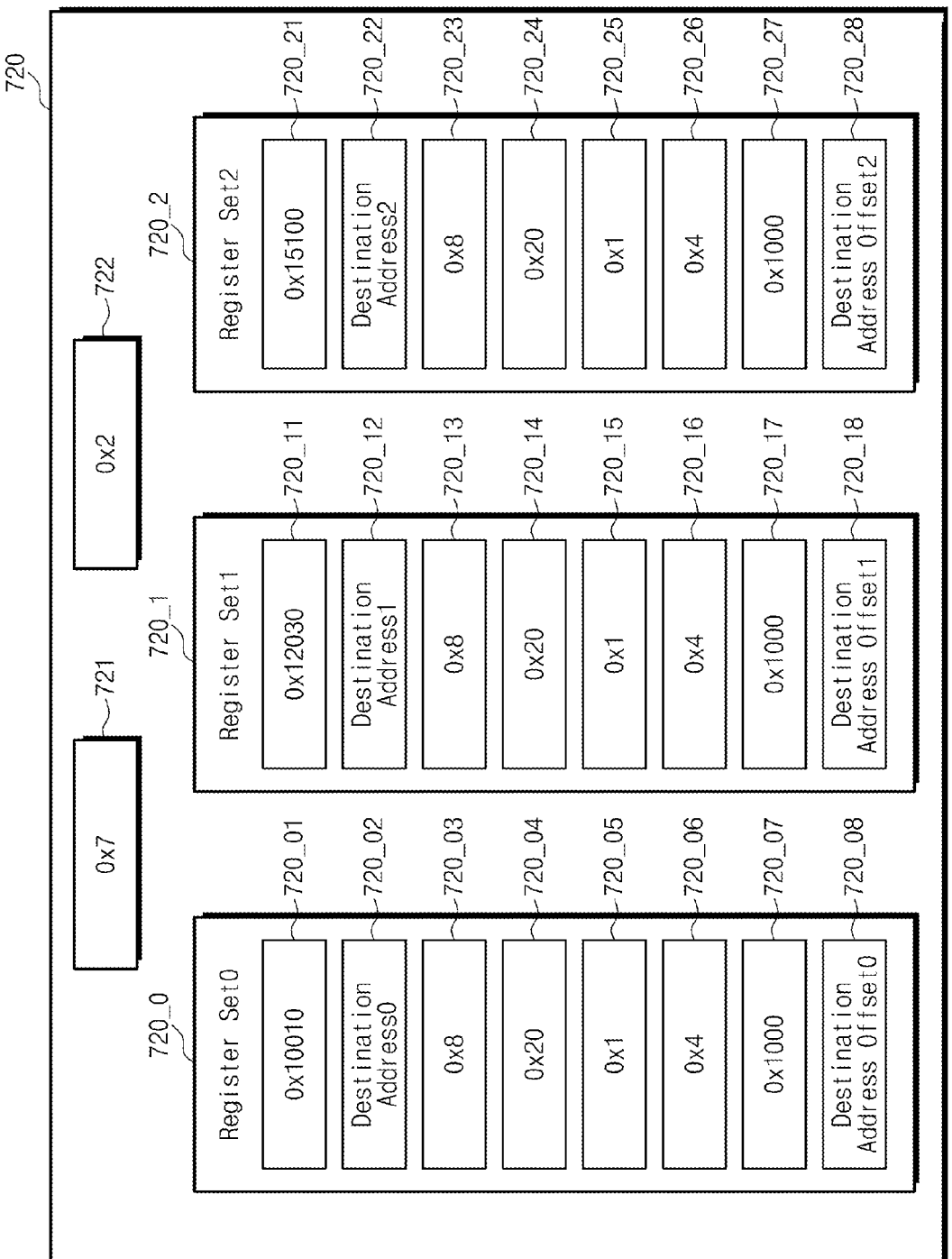
FIG. 8 is a diagram illustrating setting values of a register set unit to describe an operation of a direct memory access controller according to an exemplary embodiment of the inventive concept.

FIG. 7 is a diagram illustrating block data of a memory device to describe an operation of a direct memory access controller according to an exemplary embodiment of the inventive concept. FIG. 8 is a diagram illustrating setting values of a register set unit to describe an operation of a direct memory access controller according to an exemplary embodiment of the inventive concept. Below, a DMA loop transfer operation on block data will be more fully described with reference to FIGS. 7 and 8.

For ease of description, it may be assumed that the number of block data to be transferred by a DMA controller 600 is 6 and that a register set unit 720 includes three register sets 720_0 to 720_2 assigned to three DMA channels, respectively. Further, it may be assumed that the DMA controller 600 transfers data by the 32-bit unit.

DMA transfer may be performed by assigning three block data D0 to D2 to three DMA channels, respectively, and remaining three block data D3 to D5 to the three DMA channels via a DMA loop transfer operation on a whole DMA channel. A DMA loop transfer operation of each DMA channel may be carried out at a DMA transfer operation of each block data D0 to D5.

First of all, transfer regions in which block data D0 to D2 are stored may be assigned to DMA channels, respectively, and register sets of the DMA channels may be configured. A register set selection register 721 may be set by 0x7 to activate all DMA channels.

In FIG. 8, set-up values of register sets 720_0 to 720_2 according to transfer information of block data D0 to D2 are exemplarily illustrated.

In an exemplary embodiment, a register setting value on block data D0 is as follows. A start address register 720_01 may be set by a start address '0x10010' of a transfer region in which block data D0 is stored. A destination address register 720_02 may be set by a destination address to which the block data D0 is to be transferred. As described above, since a data transfer unit is 32-bit, a transfer unit register 720_04 may be set by a transfer size of 0x20. A transfer size register 720_03 may be set to a transfer size of 0x8 according to a transfer unit.

After a fundamental register set is established, a loop register set may be configured to perform a DMA loop transfer operation of each DMA channel. Since a loop operation of a DMA channel is performed, a loop set register 720_05 may be set by a loop enable value of 0x1. A DMA transfer operation may be iterated four times by increasing the start address of 0x10010 by an address offset of 0x1000. For this reason, a channel loop number register 72006 may be set to a loop number of 0x4 and a start address offset register 720_07 may be set to a start address offset of 0x1000. A destination address offset register 720_08 may be set to a destination address offset.

A DMA loop transfer operation of a DMA channel 0 may be performed based upon a source address, a destination address, and a transfer size of the register set 0 720_0. A DMA transfer operation may be again performed by adding a source address offset value and a destination address offset value to a previous source address and a previous destination address such that registers are set by transfer information on a next transfer region. The DMA loop transfer operation of the DMA channel 0 may be completed by iterating the above-description operation by a loop number. The DMA controller 600 may perform a DMA loop transfer operation on two block data D1 and D2 in the same manner as described above.

If a DMA loop transfer operation of each DMA channel is completed, a DMA transfer operation on remaining block data D3 to D5 may be performed via a DMA loop transfer operation on a whole DMA channel. DMA transfer operations on the remaining block data D3 to D5 may be accomplished by reconfiguring a register set unit 620 with data stored in a channel loop management memory device 630. A DMA loop transfer operation of the whole DMA channel may be performed by a loop number of 0x2 stored in a whole channel loop number register 722. The DMA loop transfer operation of the whole DMA channel will be more fully described with reference to FIGS. 7 to 10.

Figure 9:
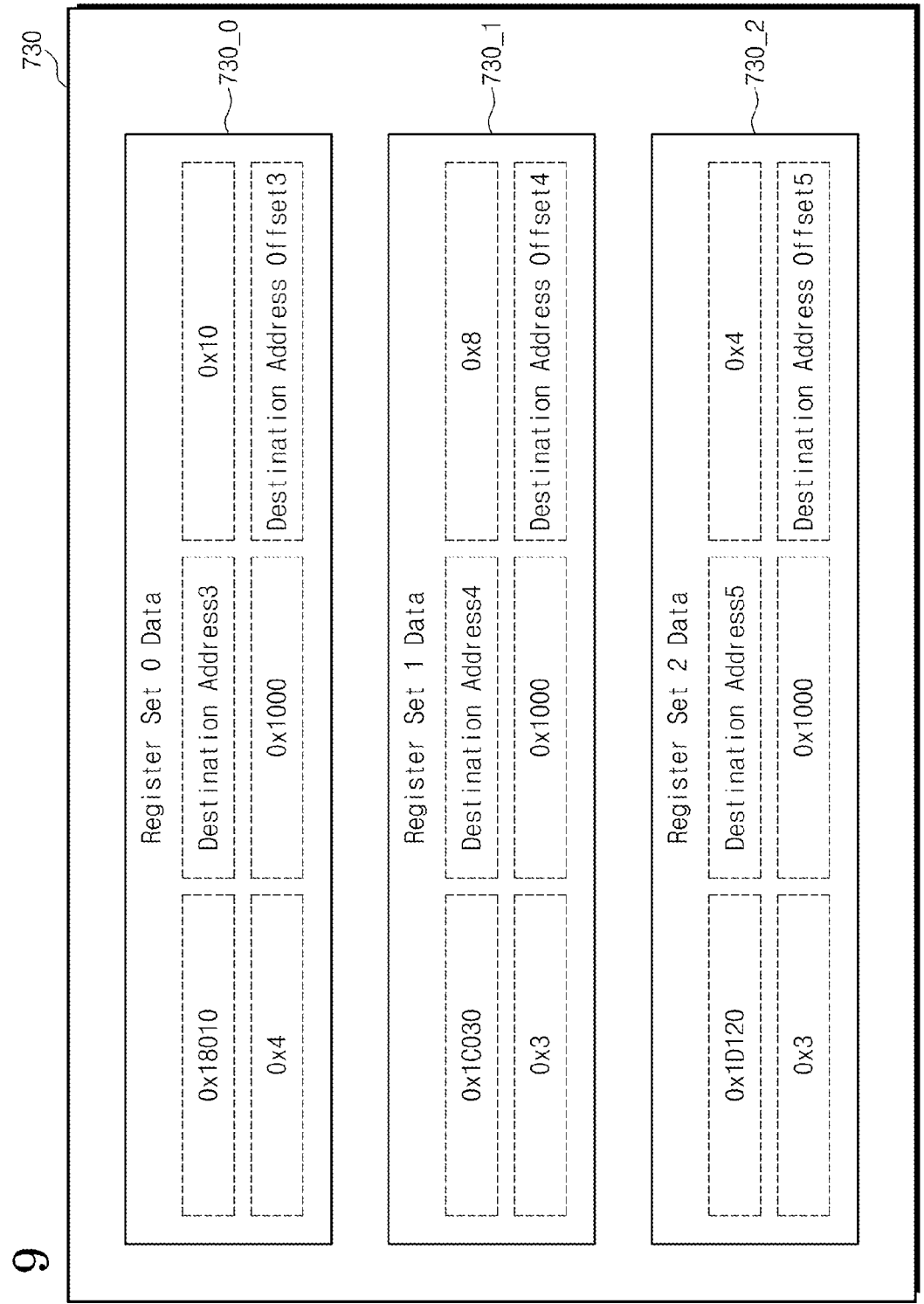
FIG. 9 is a diagram illustrating values stored in a channel loop management memory device to describe an operation of a direct memory access controller according to an exemplary embodiment of the inventive concept.
Figure 10:
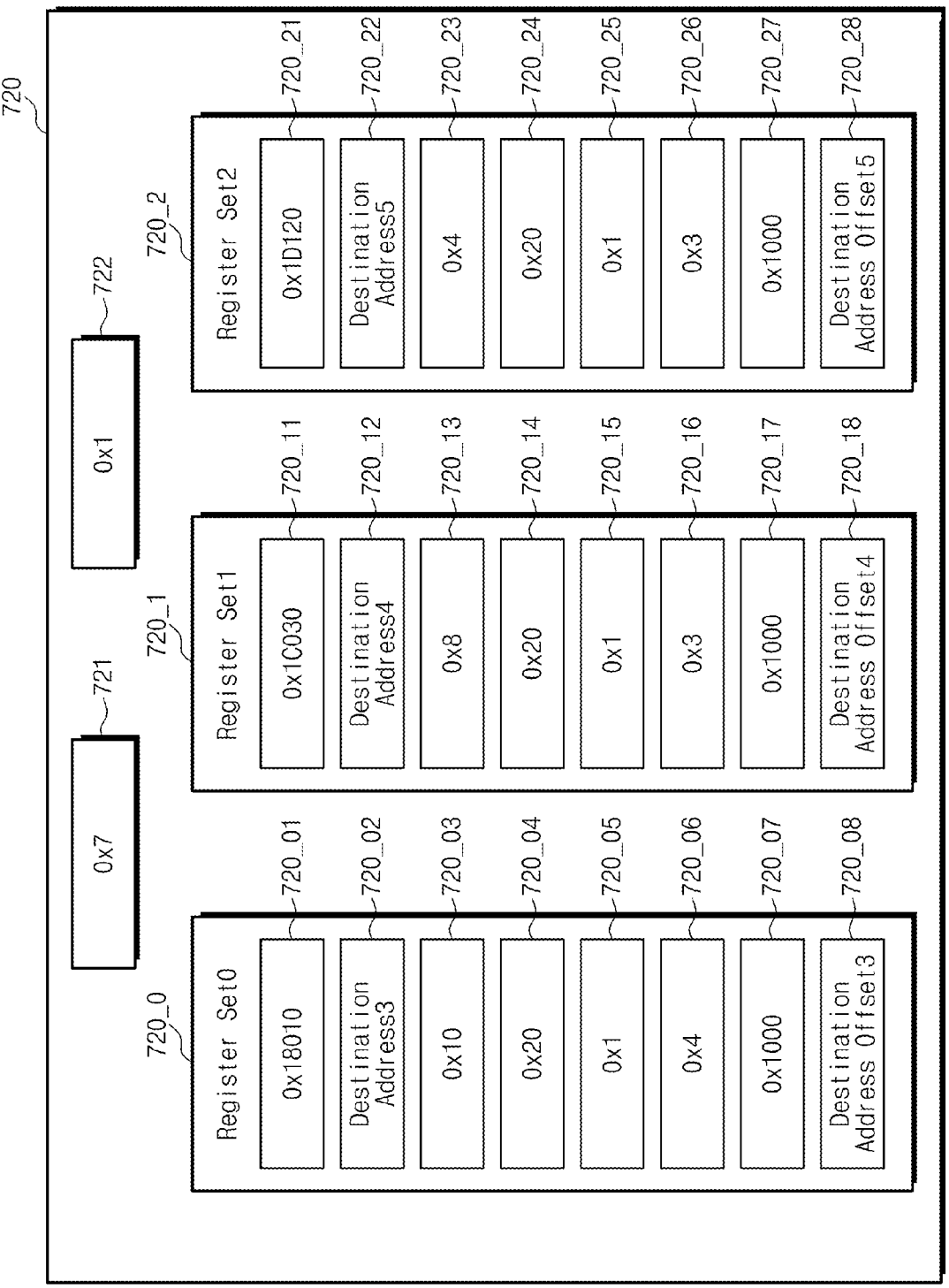
FIG. 10 is a diagram illustrating values stored in a register set unit to describe an operation of a direct memory access controller according to an exemplary embodiment of the inventive concept.

FIG. 9 is a diagram illustrating values stored in a channel loop management memory device to describe an operation of a direct memory access controller according to an exemplary embodiment of the inventive concept. FIG. 10 is a diagram illustrating values stored in a register set unit to describe an operation of a direct memory access controller according to an exemplary embodiment of the inventive concept.

If a DMA loop transfer operation on a whole DMA channel is performed after a DMA loop transfer operation of each DMA channel to transfer block data D0 to D2, registers of a register set unit 720 may be reset. The reset registers of the register set 820 may be reconfigured by data on a changed transfer region stored in a channel loop management memory device 730. That is, a source address register may be set by a source address change value, a destination address register may be set by a destination address change value, and a transfer size register may be set by a transfer size change value. A channel loop number register may be set by a loop number change value, a source address offset register may be set by a source address offset change value, and a destination address offset register may be set by a destination address offset change value. A whole channel loop number register 722 may be updated by a remaining loop number.

A setting value of a register set 0 720_0 reconfigured by a register set 0 data 730_0 stored in a channel loop management memory device 730 will be described, below. A start address register 720_01 may be set by a start address '0x18010' of a transfer region in which block data D3 is stored. A destination address register 720_02 may be set by a destination address 3 to which block data D3 is to be transferred. Since a size of the block data D3 is changed, a transfer size register 720_03 may be reconfigured by a transfer size change value of 0x10. The whole channel loop number register 722 may be updated by a remaining loop number of 0x1.

After a fundamental register set is set up, a loop register set may be reconfigured to perform a DMA loop transfer operation of each DMA channel. A loop number register 720_06, a start address offset register 720_07, and a destination address offset register 720_08 may be reconfigured by a loop number change value of 0x4, a start address offset change value of 0x1000, and a destination address offset change value (a destination address offset 3), respectively.

Remaining register sets 720_1 to 720_2 may be reconfigured in the same manner as described above, and a DMA loop transfer operation of each DMA channel on block data D3 and D5 may be performed.

As described above, a DMA controller 600 according to an exemplary embodiment of the inventive concept may make DMA loop transfer of each DMA channel via a loop register set of a register set 620 and DMA loop transfer on a whole DMA channel via data stored in a channel loop management memory device 630. That is, the DMA controller 600 may carry out a DMA transfer operation by independently changing transfer information on block data to be transferred. According to an exemplary embodiment of the inventive concept, it is possible to reduce a time taken to set registers for controlling DMA channels and a time taken to process an interrupt indicating completion of DMA transfer.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. An operating method of a direct memory access (DMA) controller including first and second DMA channels and a channel loop management memory device, comprising:
   (a) iteratively performing a DMA transfer operation of the first DMA channel based upon loop information and transfer information of the first DMA channel;
   (b) iteratively performing a DMA transfer operation of the second DMA channel based upon loop information and transfer information of the second DMA channel;
   (c) evaluating a whole channel loop number register indicating a number of remaining whole channel loops;
   (d) when the whole channel loop number register indicates one or more remaining whole channel loops,
      reconfiguring the transfer and loop information of the first and second DMA channels using data from the channel loop management memory device,
      updating the whole channel loop number register, and
      again performing the steps (a) through (d) based upon the reconfigured transfer and loop information of the first and second DMA channels; and
   performing step (d) only after both of steps (a) and (b) are ended.

2. The operating method of claim 1, wherein each of the steps (a) and (b) comprises:
   (e) performing a DMA transfer operation according to a source address and a destination address included in the transfer information;
   (f) increasing the source address by a source address offset value included in the loop information and the destination address by a destination address offset value included in the loop information; and
   (g) iterating a DMA transfer operation according to the increased source address and the increased destination address.

3. The operating method of claim 2, wherein the steps (e) to (g) are iterated by a loop number included in the loop information.

4. The operating method of claim 1, wherein the whole channel loop number register is capable of indicating a plurality of remaining whole channel loops.

5. The operating method of claim 1, further including when the whole channel loop number register indicates no remaining whole channel loops, generating an interrupt.

* * * * *